US011045993B2

(12) United States Patent
Sandrini

(10) Patent No.: US 11,045,993 B2
(45) Date of Patent: Jun. 29, 2021

(54) ONE-PIECE MOULD BOTTOM WITH OPTIMISED FLUID CIRCULATION

(71) Applicant: SIDEL PARTICIPATIONS, Octeville-sur-Mer (FR)

(72) Inventor: Maxime Sandrini, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/957,093

(22) PCT Filed: Nov. 28, 2018

(86) PCT No.: PCT/FR2018/053030
§ 371 (c)(1),
(2) Date: Jun. 22, 2020

(87) PCT Pub. No.: WO2019/122564
PCT Pub. Date: Jun. 27, 2019

(65) Prior Publication Data
US 2020/0346392 A1 Nov. 5, 2020

(30) Foreign Application Priority Data

Dec. 22, 2017 (FR) ...................................... 1762982

(51) Int. Cl.
*B29C 49/48* (2006.01)
*B29L 31/00* (2006.01)

(52) U.S. Cl.
CPC .. *B29C 49/4823* (2013.01); *B29C 2049/4828* (2013.01); *B29C 2049/4843* (2013.01); *B29C 2049/4892* (2013.01); *B29K 2905/02* (2013.01); *B29K 2905/12* (2013.01); *B29L 2031/7158* (2013.01)

(58) Field of Classification Search
CPC ........ B29C 49/4823; B29C 2049/4828; B29C 2049/4843; B29C 2049/4892
See application file for complete search history.

(56) References Cited

U.S. PATENT DOCUMENTS 5,971,740 A 10/1999 Rees
6,656,409 B1 * 12/2003 Keicher .................... F28F 7/02
264/401

(Continued)

FOREIGN PATENT DOCUMENTS

WO WO-2020099755 A1 * 5/2020 ......... B29C 49/4823

OTHER PUBLICATIONS

International search report dated Mar. 21, 2019.

*Primary Examiner* — Robert B Davis

(57) ABSTRACT

The present invention relates to a mold bottom extending about a central axis and comprising a molding wall made as a single piece and defining a molding surface; a cavity formed inside the molding wall, and having a central area, a peripheral area, and a middle area; a central pipe supplying the cavity with heat-transfer fluid, that opens in the central area via one or more central openings; and at least one pipe for discharging the heat-transfer fluid from the cavity, into which the peripheral area opens. According to the invention, the mold bottom comprises a bypass that brings the central pipe into direct communication with the middle area of the cavity by bypassing the central area.

20 Claims, 14 Drawing Sheets

(56) References Cited

U.S. PATENT DOCUMENTS

| | | |
|---|---|---|
| 7,025,584 B2 | 4/2006 | Tsau |
| 2002/0165634 A1* | 11/2002 | Skszek .................... B29C 45/37 700/118 |
| 2006/0170138 A1 | 8/2006 | Miller et al. |
| 2016/0325483 A1 | 11/2016 | Langlois et al. |
| 2016/0332356 A1 | 11/2016 | Langlois et al. |

* cited by examiner

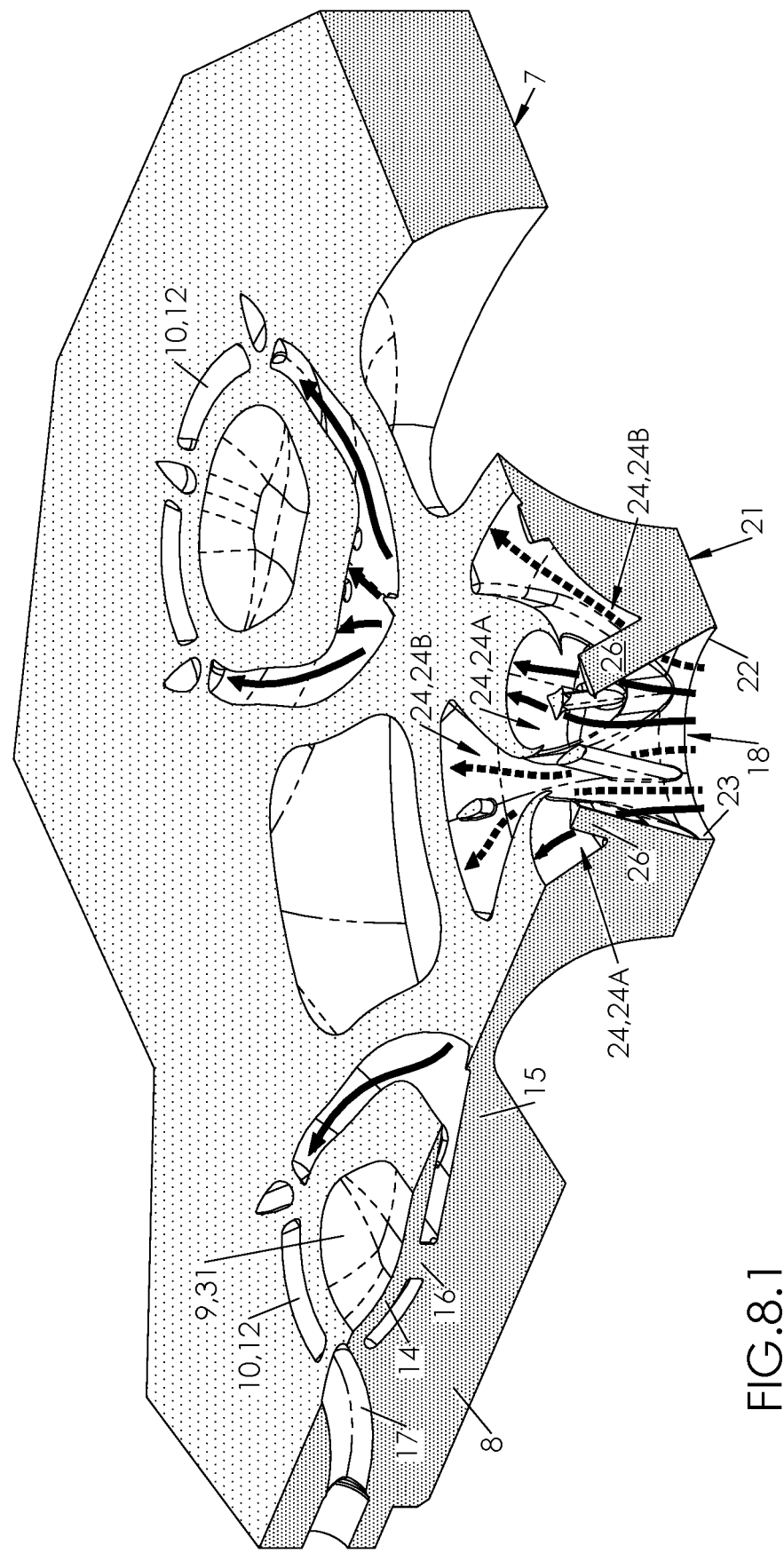
FIG.8.1

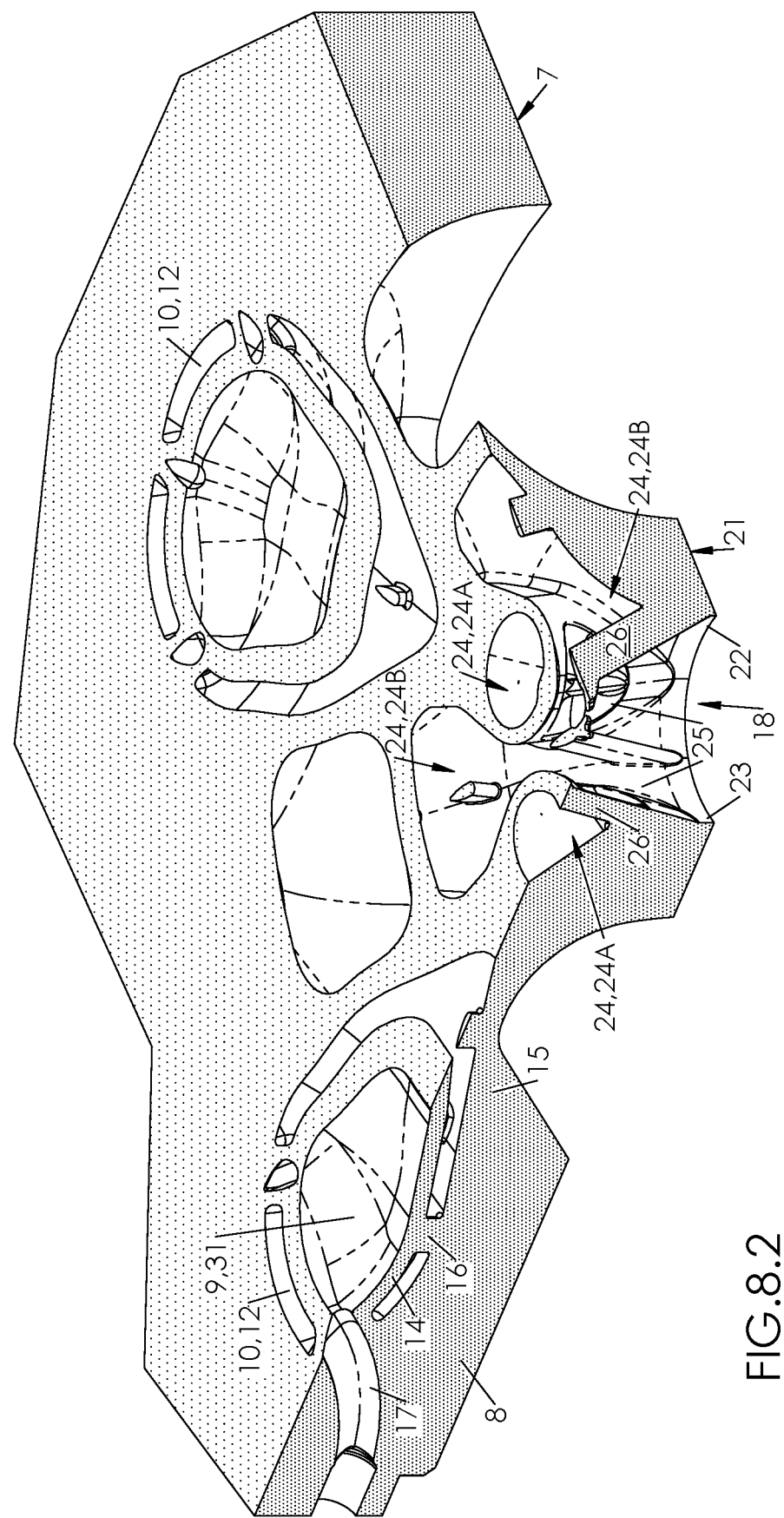
FIG.8.2

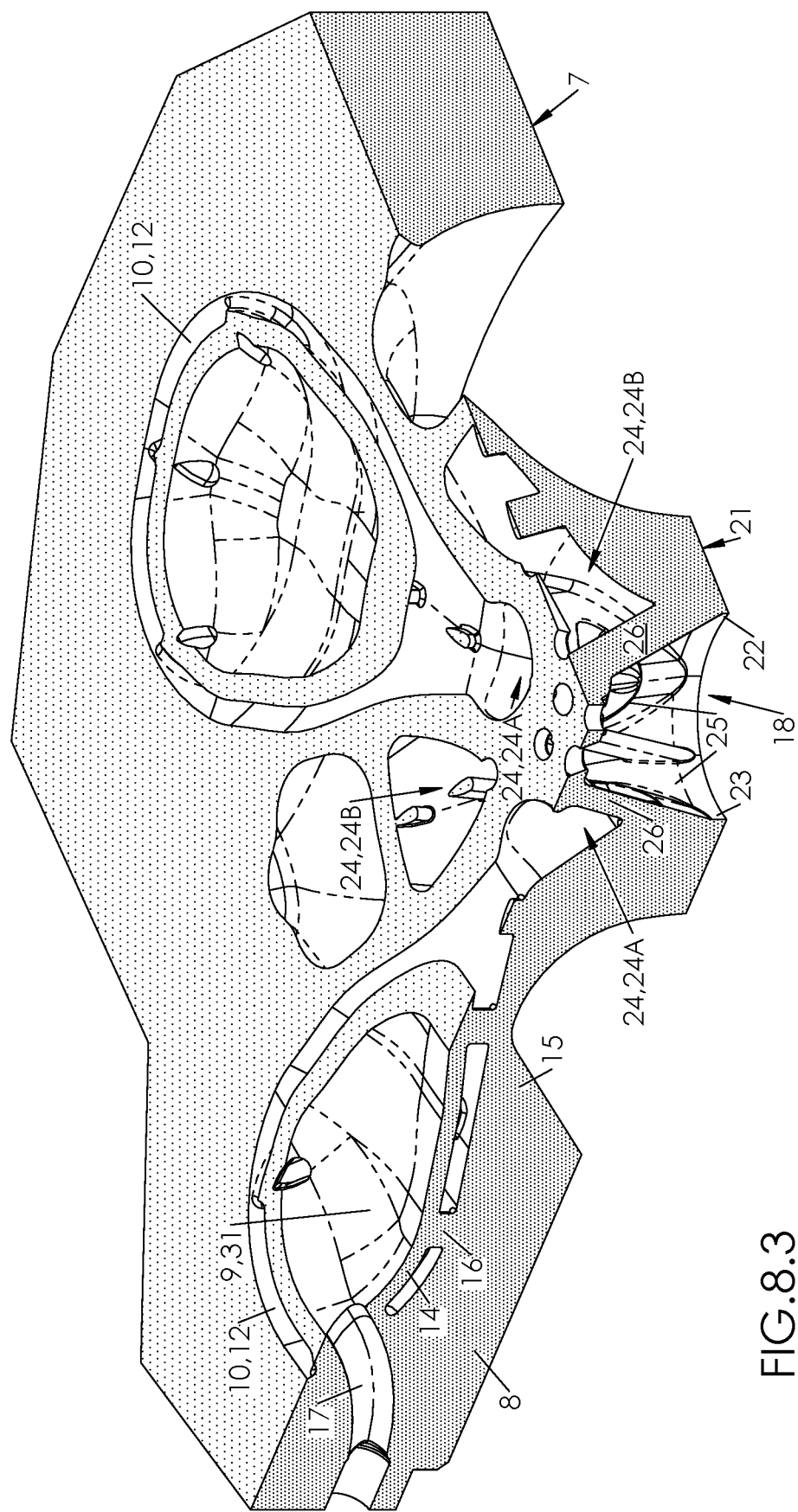
FIG.8.3

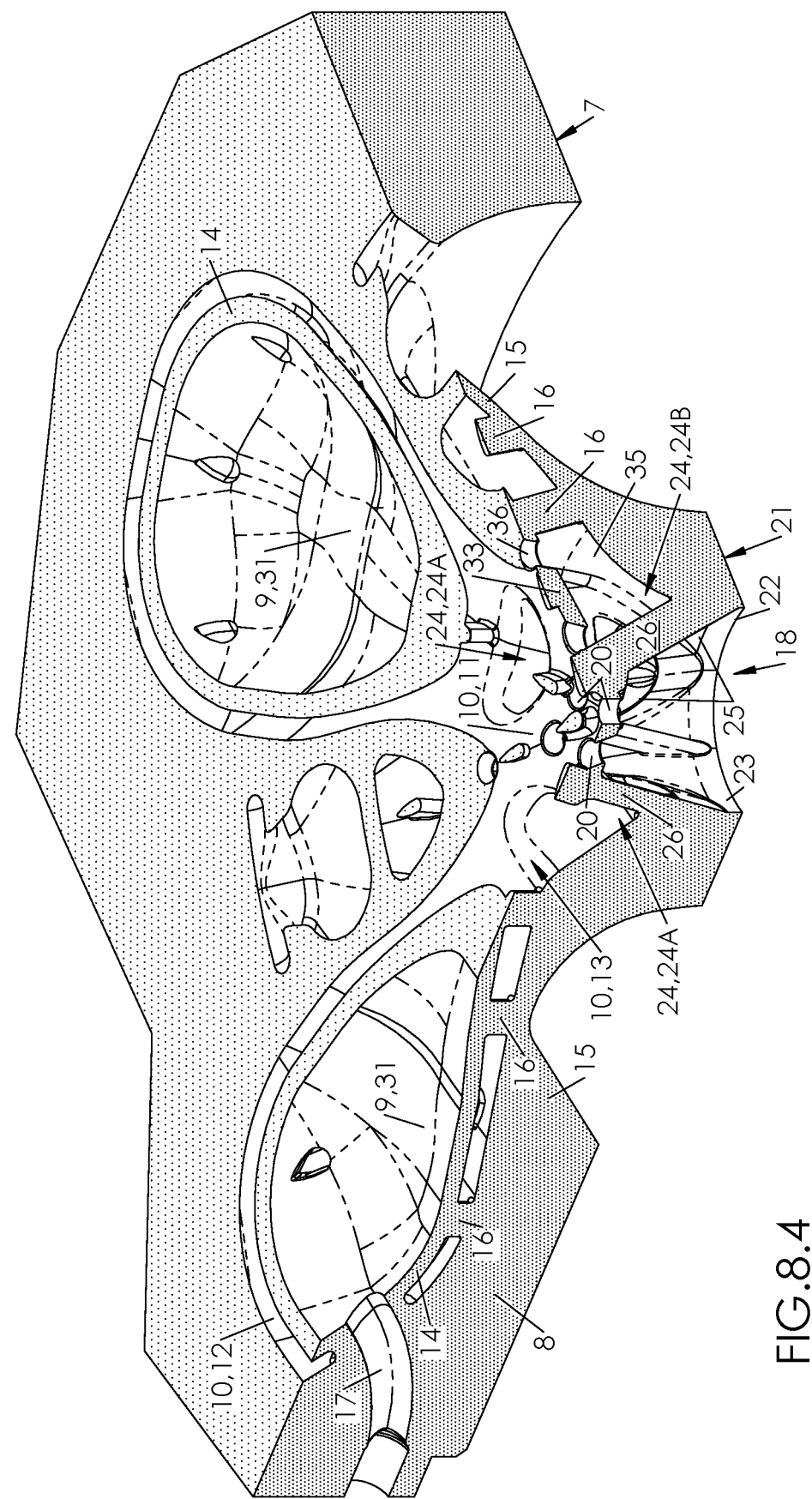
FIG.8.4

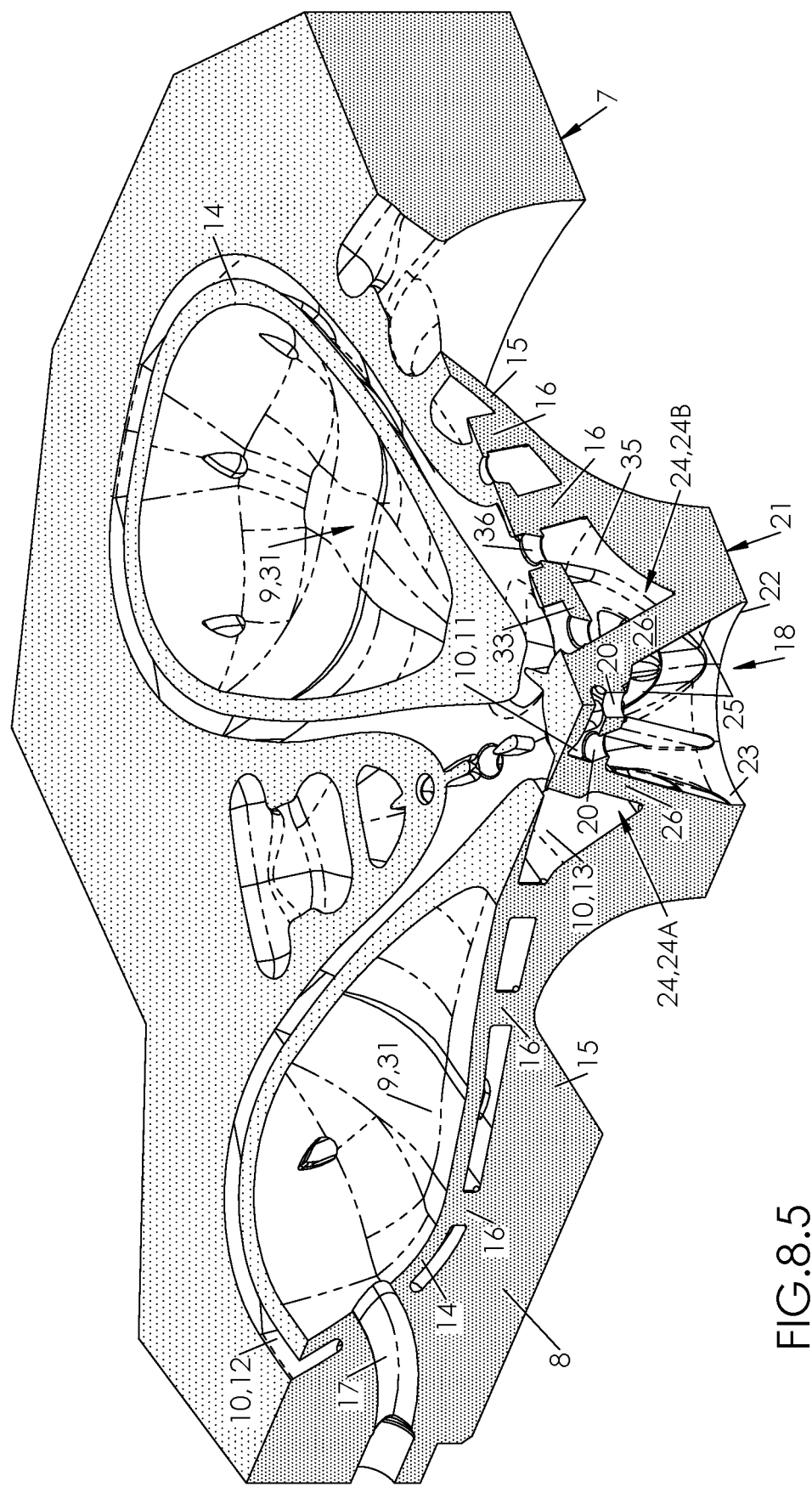
FIG.8.5

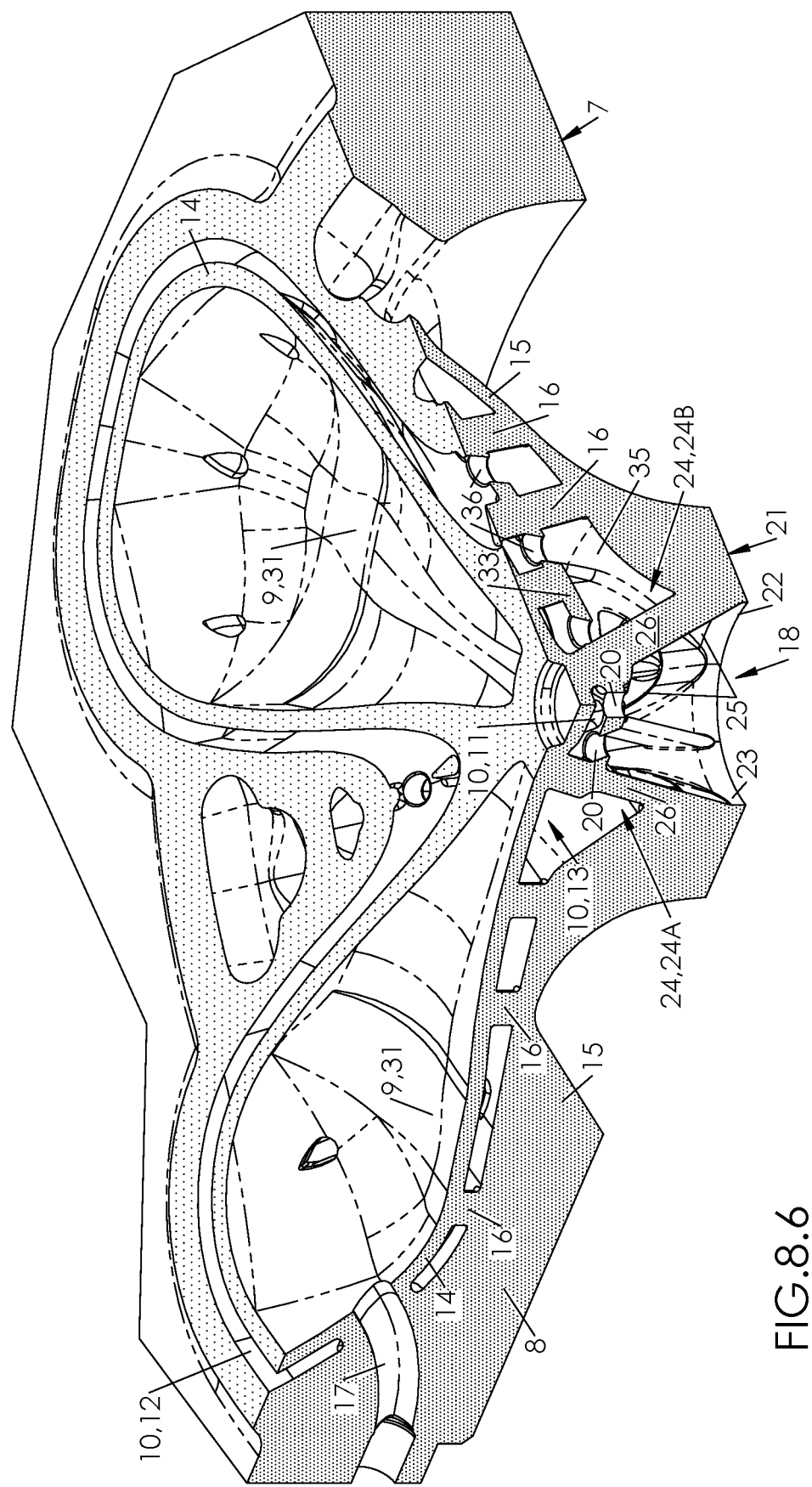
FIG.8.6

ONE-PIECE MOULD BOTTOM WITH OPTIMISED FLUID CIRCULATION

The invention relates to the molding of containers from blanks made of plastics material, by blow-molding or stretch-blow-molding in a mold having the imprint of a model of container to be molded.

The term "blank" may denote a (raw injection) preform or an intermediate container that has undergone a prior blow-molding operation from a preform, and is intended to undergo other finishing operations to result in the final container.

A typical mold comprises, for the one part, a lateral wall (having the imprint of a body of the container model) generally subdivided into two half-molds that are mutually articulated so as to allow the introduction of a blank, and, for the other part, a mold bottom (having the imprint of a bottom of the container model) ordinarily positioned in an opening provided in the bottom of the half-molds.

A typical mold is thermally regulated so as to ensure that it is kept at a stable temperature making it possible either to cool the containers at the end of molding (in the majority of cases), or to heat them in rarer cases in which the containers need to be heat-set in order to be able to receive a hot container without deforming.

The thermal regulation is generally effected by circulation, in the mold, of a heat transfer fluid (in the form of a gas or liquid: it is usually water or oil), through a fluid circuit formed at least partially in the elements of the mold (half-molds, mold bottom).

It is common to machine into the mass of the mold bottom a serpentine channel in which the heat transfer fluid circulates, as illustrated in the American patent U.S. Pat. No. 7,025,584 (Wenworth). However, in this architecture, the channel only roughly follows the molding face defined by the mold bottom.

It is known, furthermore, to drill radial channels so as to attempt to follow the relief of the mold bottom. However, this technique, which is illustrated in particular in the American patent U.S. Pat. No. 5,971,740 (Rees), does not make it possible to effect uniform exchanges of heat.

In practice, these two architectures may be suitable (although imperfectly) for mold bottoms having a fairly flat relief. On the other hand, their limits come to bear in the case of mold bottoms in which the imprint has a pronounced relief, for example a spherical imprint or a petaloid imprint.

A mold bottom with a spherical imprint is provided for forming a container having a spherical bottom to which a base is attached (fixed typically by snap-fastening, adhesive bonding or welding).

As regards a bottom having a petaloid imprint, this comprises an alternation of ribs (corresponding to valleys in the bottom of the container) and recessed indentations (corresponding to feet on the bottom of the container).

In both of these cases, the machining of a serpentine channel or the drilling of radial channels is not enough to ensure effective thermal regulation of the mold bottom, at which steep thermal gradients are observed, indicating a lack of uniformity of exchanges of heat, to the detriment of the quality of the final container.

It has recently been proposed, cf. the application WO 2015/092196 (Sidel), to manufacture a one-piece mold bottom by additive manufacturing, said mold bottom incorporating a cavity, which follows the relief of the imprint defined by the mold bottom and in which a heat transfer fluid circulates.

The performance of this mold bottom, in terms of thermal regulation, is much better than that of the abovementioned mold bottoms. However, tests carried out under cold thermal regulation with a mold bottom according to the abovementioned application have shown (by infrared thermography) that certain zones of the bottom of the container, which are situated in a median zone at a distance (but not far) from the center and in the region of the feet, exhibit a temperature that is still too high, which is a sign of insufficient cooling. As a result, the zones affected are poorly stretched during molding and consequently exhibit, in the final container, a significant thickness that makes it difficult to cool them.

It will thus be understood that it is appropriate to improve this one-piece mold bottom so as to make it more effective in terms of thermal regulation, and more specifically to accelerate the cooling of certain difficult zones corresponding to the bottom of the container having thick zones.

More specifically, an objective is to promote the flow of the heat transfer fluid toward these difficult zones in order to increase the flow rate therein and thus to optimize the exchanges of heat therein with the container being formed.

To this end, firstly, a mold bottom intended for a mold for manufacturing containers by blow-molding or stretch-blow-molding from blanks made of plastics material is proposed, this mold bottom extending about a central axis and comprising:
  a molding wall, which is formed as a single block and defines a molding surface;
  a cavity formed on the inside of the molding wall, this cavity having a central zone situated in the vicinity of the central axis of the mold bottom, a peripheral zone, situated at a distance from the central axis, and an intermediate median zone between the central zone and the peripheral zone;
  a central duct for feeding heat transfer fluid to the cavity, which leads into the central zone through one or more central opening(s);
  at least one duct for evacuating the heat transfer fluid from the cavity, into which the peripheral zone leads;
this mold bottom being characterized in that it comprises a bypass, which places the central duct in direct communication with the median zone of the cavity, bypassing the central zone.

By virtue of this bypass, the median zone of the cavity, situated in line with zones of the molding surface that require significant heat exchange, can be fed directly with heat transfer fluid taken directly from the central feed duct. This makes it possible to improve the quality of the final container.

Various additional features can be provided, alone or in combination. Thus, for example:
  the central feed duct is delimited radially by a lateral wall, through which the bypass opens, by way of an inner mouth, into the central duct;
  the mold bottom is provided with stiffeners that brace the inner mouth of the bypass;
  each stiffener has a fin profile, oriented radially, in horizontal section;
  the cavity is delimited by an internal skin, which defines the molding surface, and by an external skin;
  the internal skin has a thickness of between 0.2 mm and 5 mm, for example around 0.5 mm;
  the mold bottom comprises a network of struts that connect the internal skin and the external skin.

According to a first embodiment, in which the molding surface has a relief with the imprint of a petaloid container, and defines an alternation of ribs and recessed indentations, the bypass comprises for example:

primary bypass channels that each place the central feed duct in communication with a part of the median zone of the cavity that is situated in the region of a recessed indentation;

secondary bypass channels that each place the central feed duct in communication with a part of the median zone of the cavity that is situated in the region of a rib.

The primary channels and secondary channels are preferably disposed in alternation about the central feed duct.

According to a second embodiment, the bypass is advantageously in the form of an individual duct surrounding the central axis.

Secondly, a mold for manufacturing containers from blanks made of plastics material is proposed, which comprises such a mold bottom.

Further subjects and advantages of the invention will become apparent in the light of the description of an embodiment, which is given below with reference to the appended drawings, in which.

Figure 9:
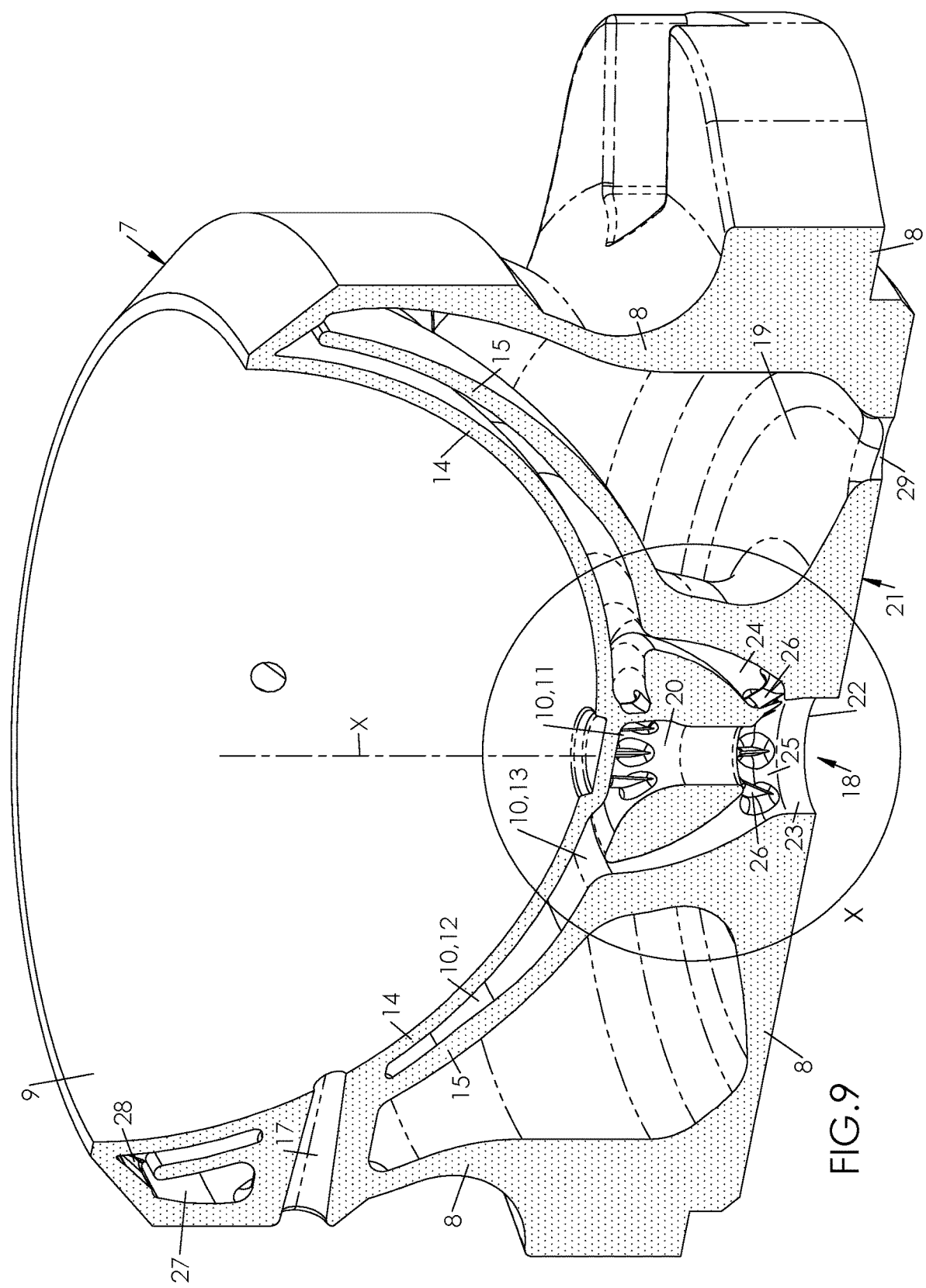
Figure 10:
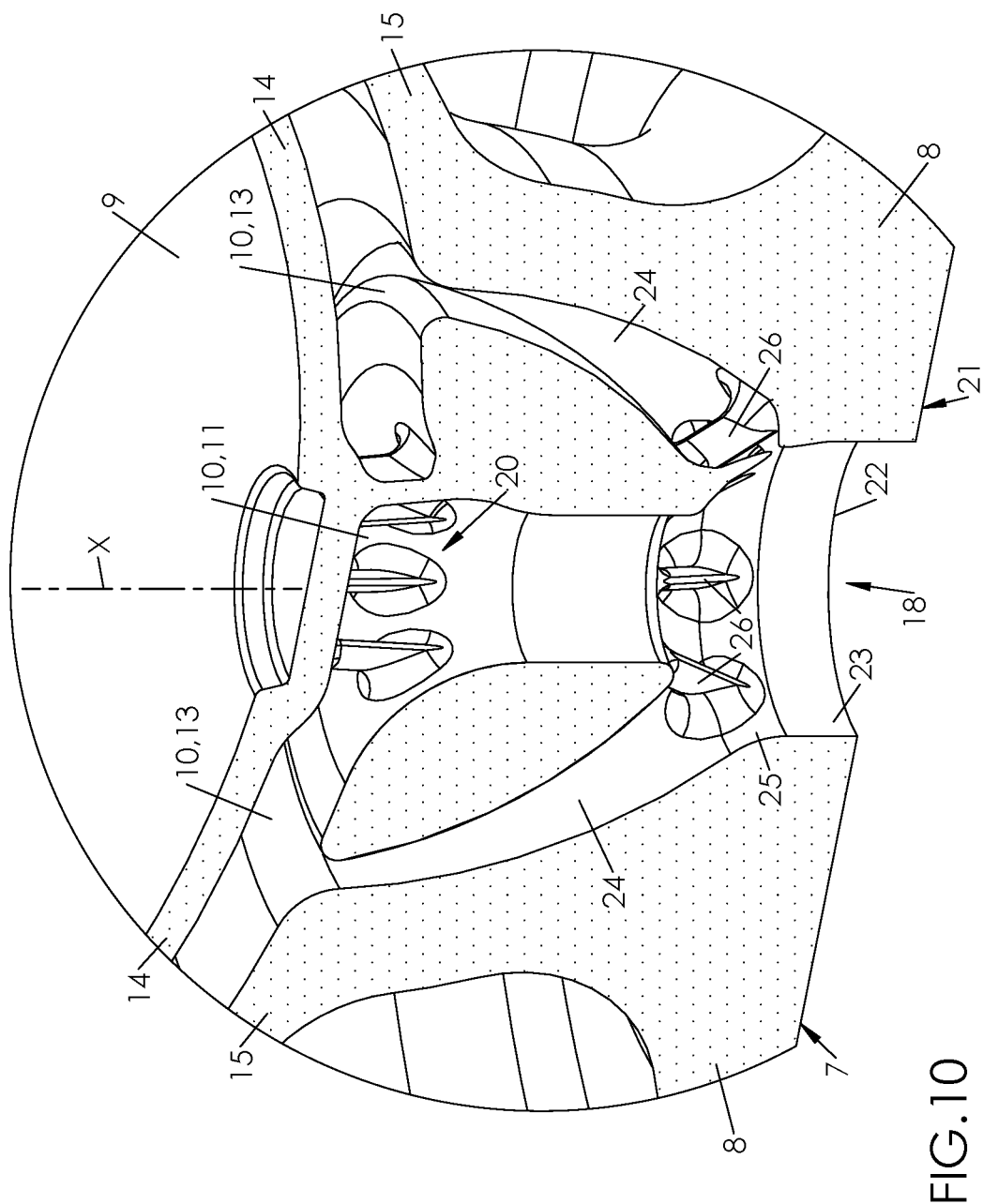

FIG. 8.1, FIG. 8.2, FIG. 8.3, FIG. 8.4, FIG. 8.5 and FIG. 8.6 (denoted FIG. 8 overall) are horizontal sections through a sector of the mold bottom having a petaloid imprint in FIG. 2 to FIG. 7, taken in equidistant superposed horizontal planes;

FIG. 9 is a perspective view in section of a one-piece mold bottom with optimized fluid circulation, for another form of imprint of the container bottom;

FIG. 10 is a detail view of the bottom in FIG. 9, taken from the ring X.

Figure 1:
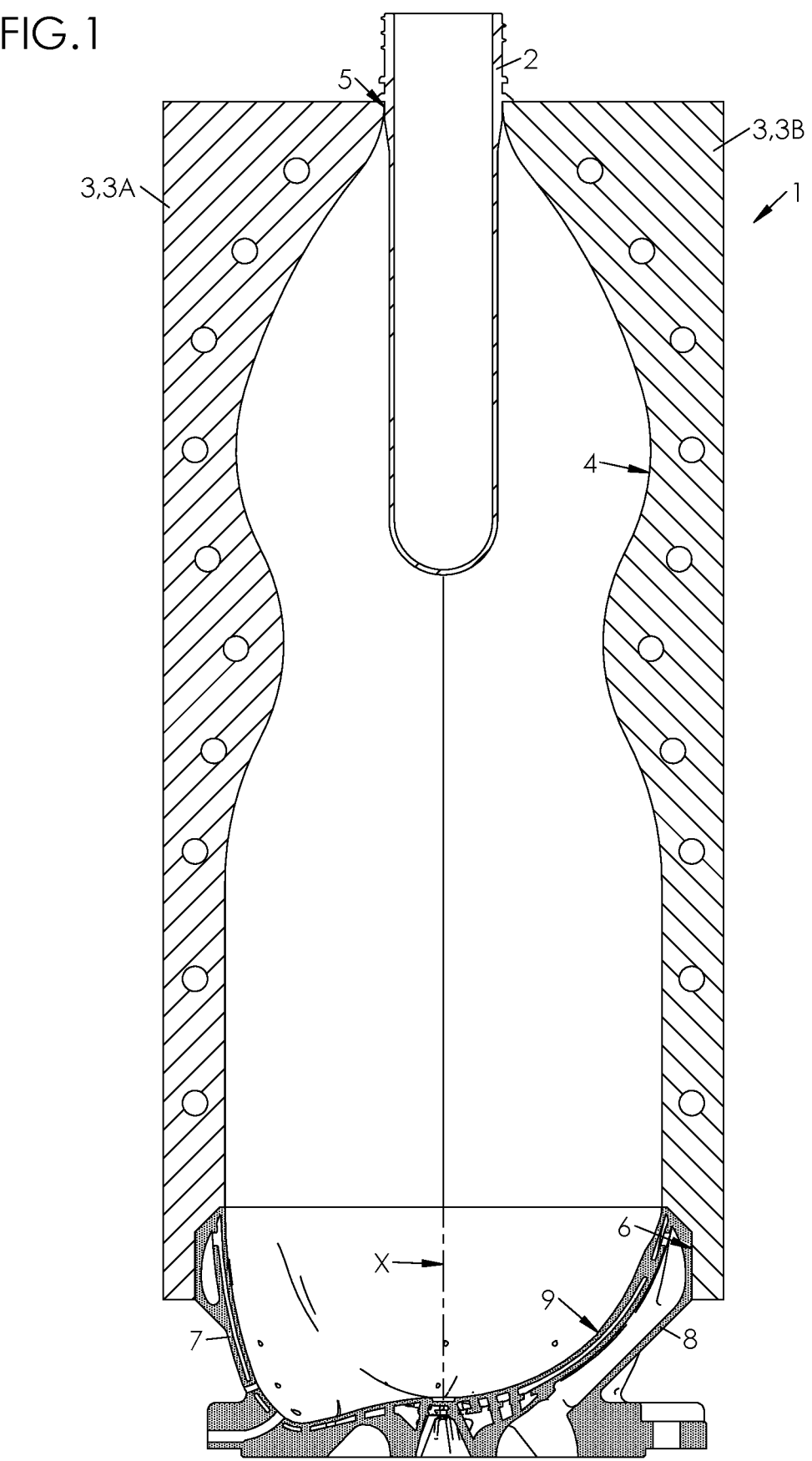
FIG. 1 is a view in section of a mold incorporating a one-piece mold bottom with optimized fluid circulation.
Figure 2:
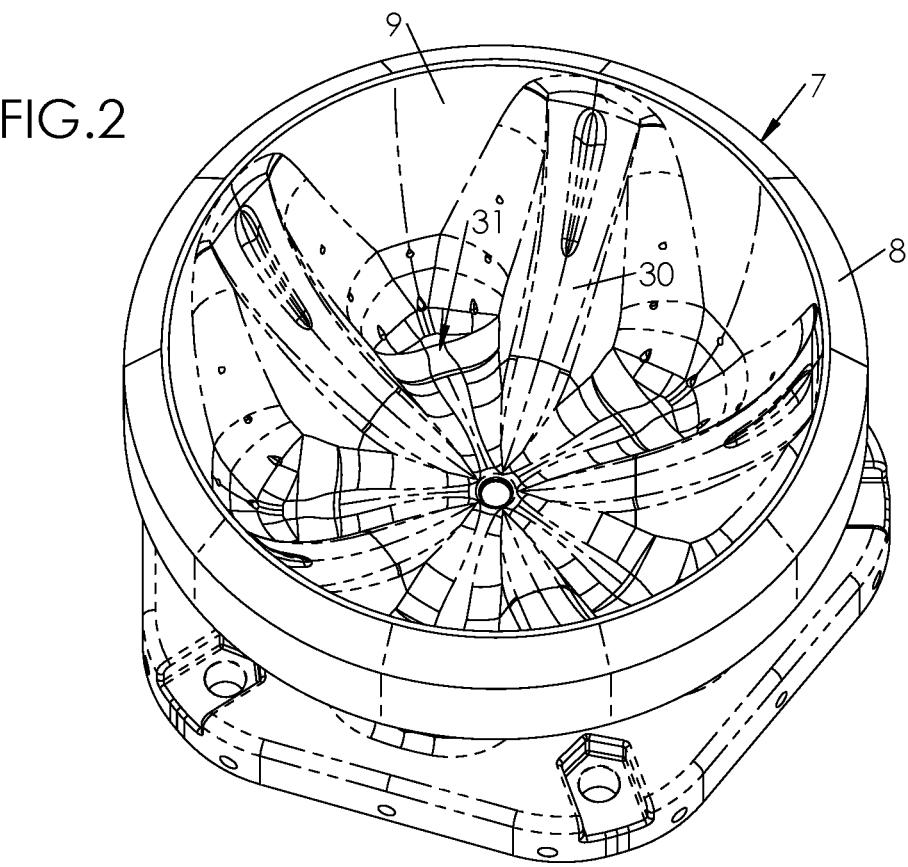
FIG. 2 is a perspective top view of the mold bottom, in a version having a petaloid imprint.
Figure 3:
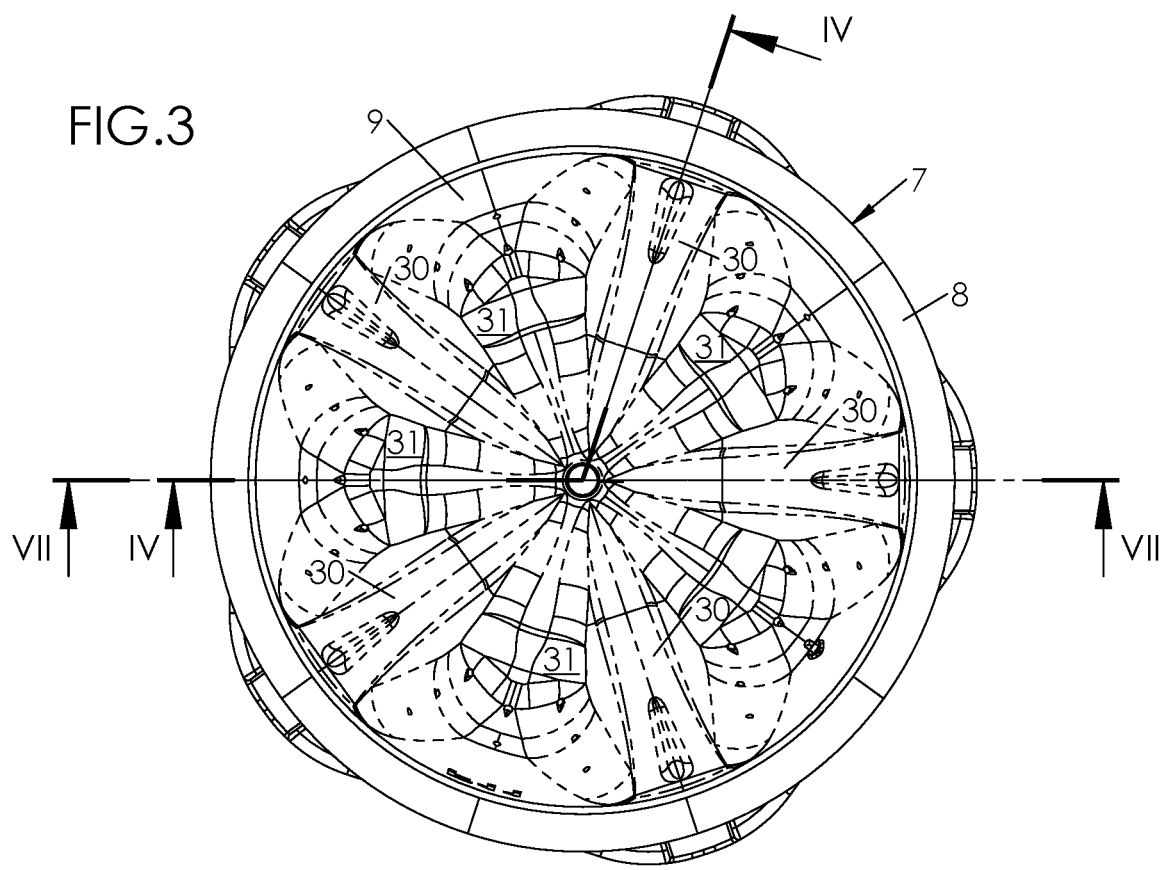
FIG. 3 is a top view of the mold bottom in FIG. 2.

FIG. 1 shows a mold 1 for molding a container from a blank 2 made of plastics material, by blow-molding or stretch-blow-molding.

The blank 2 may (as in the example illustrated in FIG. 1) be a preform, obtained by injection-molding a plastics material (such as PET), or an intermediate container that has undergone a first blow-molding operation from a preform and is intended to undergo one or more finishing operations in order to be converted into a final container.

The mold 1 comprises, firstly, a lateral wall 3 that defines a molding surface 4 in relief having the imprint of a body of the container to be molded. In the example illustrated, the lateral wall 3 comprises two half-molds 3A, 3B that are mutually articulated about a common vertical axis, between an open position of the mold 1, in which the half-molds 3A, 3B are spaced apart from one another, and a closed position, in which the half-molds 3A, 3B are pressed together. The open position makes it possible to introduce the blank 2 into the mold 1 and, conversely, to remove the molded container, and the closed position determines the imprint of the container and thus allows the latter to be molded, by blow-molding or stretch-blow-molding of the blank 2.

The lateral wall 3 defines an upper opening 5, through which the preform 2 extends during the molding of the container, and an opposite lower opening 6.

The mold 1 comprises, secondly, a mold bottom 7. The mold bottom 7 is advantageously mounted on a support known as a support ring. The mold bottom 7 is, with the support ring, mounted so as to be movable in translation along an axial direction between a low position, which it takes up in the open position of the mold 1 to make it easier to remove a molded container, and a high position, which it takes up in the closed position and in which it closes off the lower opening 6.

The mold bottom 7 extends about a central axis X (coincident with a central axis of the container to be molded) and comprises a molding wall 8, which defines a molding surface 9 having the imprint of at least a part of a bottom of the container to be molded.

The mold bottom 7 denotes the functional component, with its solid parts and its hollow parts, for obtaining the molding of the bottom of the container while having a heat transfer fluid intended to ensure the thermal regulation thereof circulate.

The molding wall 8 denotes the solid part of the mold bottom 7, that is to say the region of the mold bottom 7 in which the constituent material of the mold bottom 7 is located.

The molding wall 8 is formed as a single block (or in one piece), meaning that it is in the form of a unitary element obtained by a manufacturing process that does not include an intermediate assembly step (examples will be provided below). In other words, the material of the molding wall 8 extends continuously, without a parting line between different parts.

The mold bottom 7 comprises a cavity 10 formed inside the molding wall 8. This cavity 10 is intended to allow the circulation of a heat transfer fluid ensuring heat exchange between the container being molded and the molding wall 8.

The heat transfer fluid can in particular be water or oil. It is intended to carry heat energy to ensure thermal regulation of the molding surface 9:

either to keep it at a lower temperature (typically 10° C.) than the temperature of the bottom of the container (this being the most common case of cooling), or to keep it at a higher temperature (typically 140° C.) than the temperature of the bottom of the container (this being the particular case of heating, in particular for heat-setting the material).

The cavity 10 has:

a central zone 11, situated in the vicinity of the central axis X;

a peripheral zone 12, situated at a distance from the central axis X;

and an intermediate median zone 13 between the central zone 11 and the peripheral zone 12.

There is not necessarily a clean separation between the different zones 11, 12, 13. However, when projected (geometrically) onto the bottom of the container, they correspond to zones on the latter that afford different thermal inertia on account of their different material thicknesses.

Specifically, in the vicinity of the axis X, the bottom of the container has a great thickness since the material is poorly stretched there (in fact, the thickness of material there is usually greater than 1 mm). By contrast, at a distance from the central axis X, that is to say at the periphery, the bottom of the container has a small thickness since the material is highly stretched there (in fact, the material thickness is usually around a tenth of a millimeter).

Between these two zones, the bottom of the container has a thickness that varies, and more precisely that decreases radially from the inside (in the vicinity of the central axis of the container) to the outside.

In practice, in this case:

- the central zone 11 of the cavity 10 is considered to extend inside a diameter less than or equal to 15% of the overall diameter of the molding surface 9 and preferably less than or equal to 12% of said diameter (when measured in a plane perpendicular to the central axis X);
- the median zone 13 of the cavity 10 is considered to extend beyond the central zone 11 and inside a diameter of between 12% and 40% of the overall diameter of the molding surface 9;
- the peripheral zone 12 is considered to extend beyond the median zone 13.

According to an embodiment illustrated in the drawings, the cavity 10 is delimited by an internal skin 14, which defines the molding surface 9, and by an external skin 15. The internal skin 14 is relatively thin, its thickness being between 0.2 mm and 5 mm, for example 0.5 mm. The internal skin 14 furthermore has a substantially constant thickness.

The mold bottom 7 advantageously comprises a network of struts 16 that connect the internal skin 14 and the external skin 15 and have the function of reinforcing the mold bottom 7.

According to a preferred embodiment, the mold bottom 7 is pierced by decompression vents 17 that pass through the internal skin 14, the external skin 15 and the cavity 10 so as to place the internal volume of the mold bottom 7 in communication with the exterior thereof and therefore make it easier to evacuate air located in a compressed state between the mold surface 9 and the bottom of the container on account of the inflation of the blank during the molding of the container.

The mold bottom 7 also comprises:

- a central duct 18 for feeding the cavity 10 with heat transfer fluid;
- at least one duct 19 for evacuating the heat transfer fluid from the cavity 10, into which the peripheral zone 12 leads.

The central duct 18 leads into the central zone 11 of the cavity 10 through one or more central openings 20.

Furthermore, the central duct 18 leads onto a lower (preferably flat) face 21 of the mold bottom 7 through an inlet orifice 22.

Moreover, the central feed duct 18 is delimited, radially, by a lateral wall 23. In the examples illustrated, this lateral wall 23 is cylindrical overall.

The fluid channeled through the lateral wall 23 passes through the central opening(s) 20 and into the central zone 11 of the cavity 10, thereby ensuring heat exchange with the portion of the molding surface 9 (and thus with the portion of the container) that extends in line with the central zone 11. The fluid then disperses radially from the central zone 11 to the peripheral zone 12, passing through the median zone 13. When the fluid injected into the cavity 10 through the central zone 11 arrives in the median zone 13, it has a reduced heat exchange capacity on account of the exchanges of heat that have already taken place in the central zone 11.

This is why, in order to maintain a good heat exchange capacity of the heat transfer fluid in the median zone 13, the mold bottom 7 comprises a bypass 24, which places the central feed duct 18 in direct communication with the median zone 13 of the cavity 10, bypassing the central zone 11. Thus, fluid is withdrawn from the central feed duct 18 in order to be injected directly into the median zone 13. In this way, the overall heat exchange capacity of the fluid is increased in the median zone 13, to the benefit of the thermal regulation of the molding surface 9 (and thus of the container) in this region.

According to a preferred embodiment, the flow cross section of the bypass 24, measured at the mouth, is greater than or equal to at least 50% of the flow cross section of the central duct upstream of the mouth, such that more than half of the stream of heat transfer fluid is taken off by the bypass. As will be read below, the bypass is subdivided into primary channels 24A and secondary channels 24B, and it is the sum of the sections of all of these channels 24A, 24B that is greater than or equal to 50% of the flow cross section of the central duct upstream of the mouth.

As can be seen in the illustrations, the bypass 24 opens, by way of an inner mouth 25, into the central feed duct 18. In order to ensure its integrity and its mechanical strength, the mold bottom 7 is advantageously provided with stiffeners 26 that brace the inner mouth 25 of the bypass 24.

Figure 5:
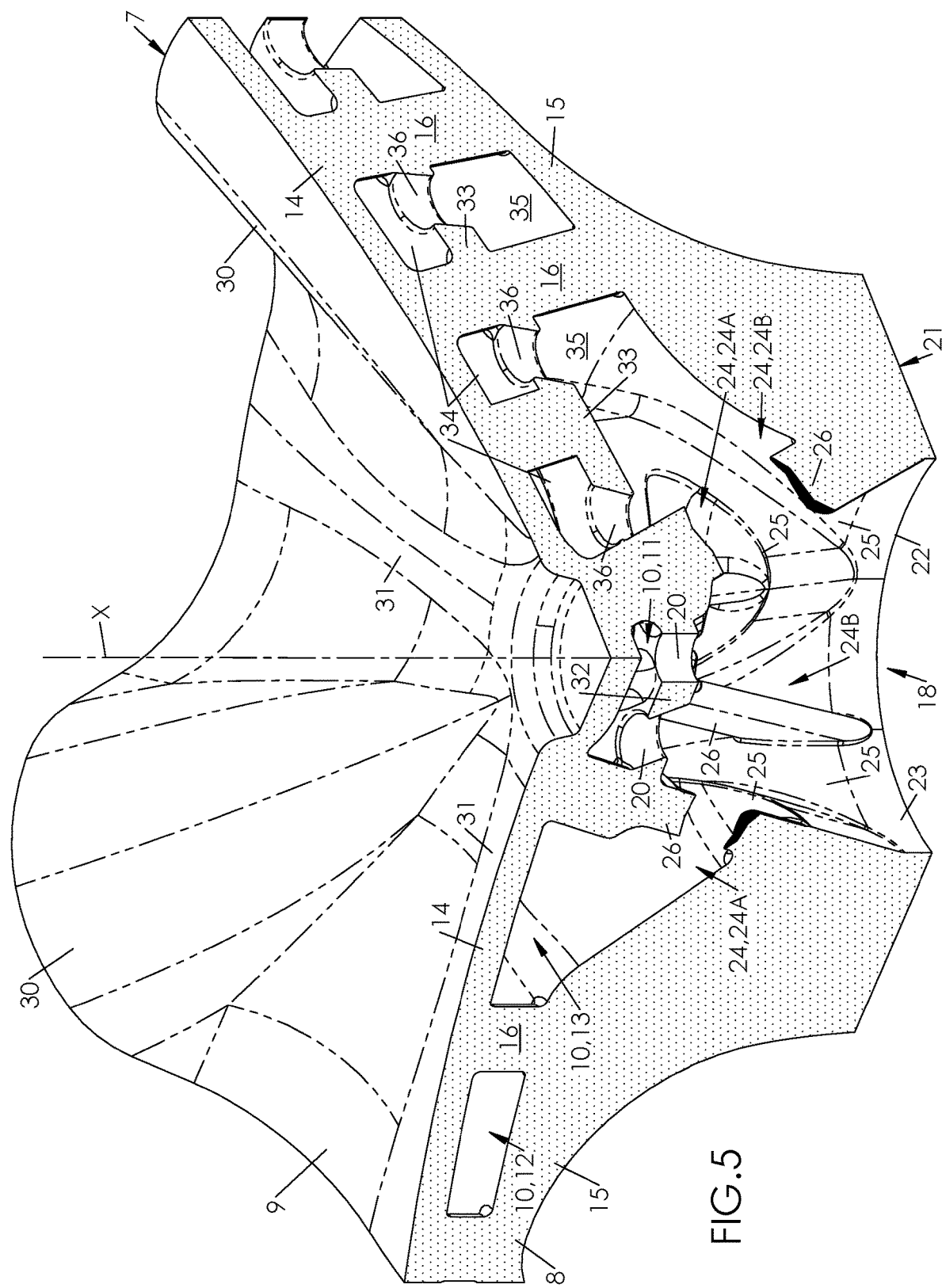
FIG. 5 is a top perspective detail view in section of a sector of the mold bottom, taken from the ringed detail V in FIG. 4.
Figure 6:
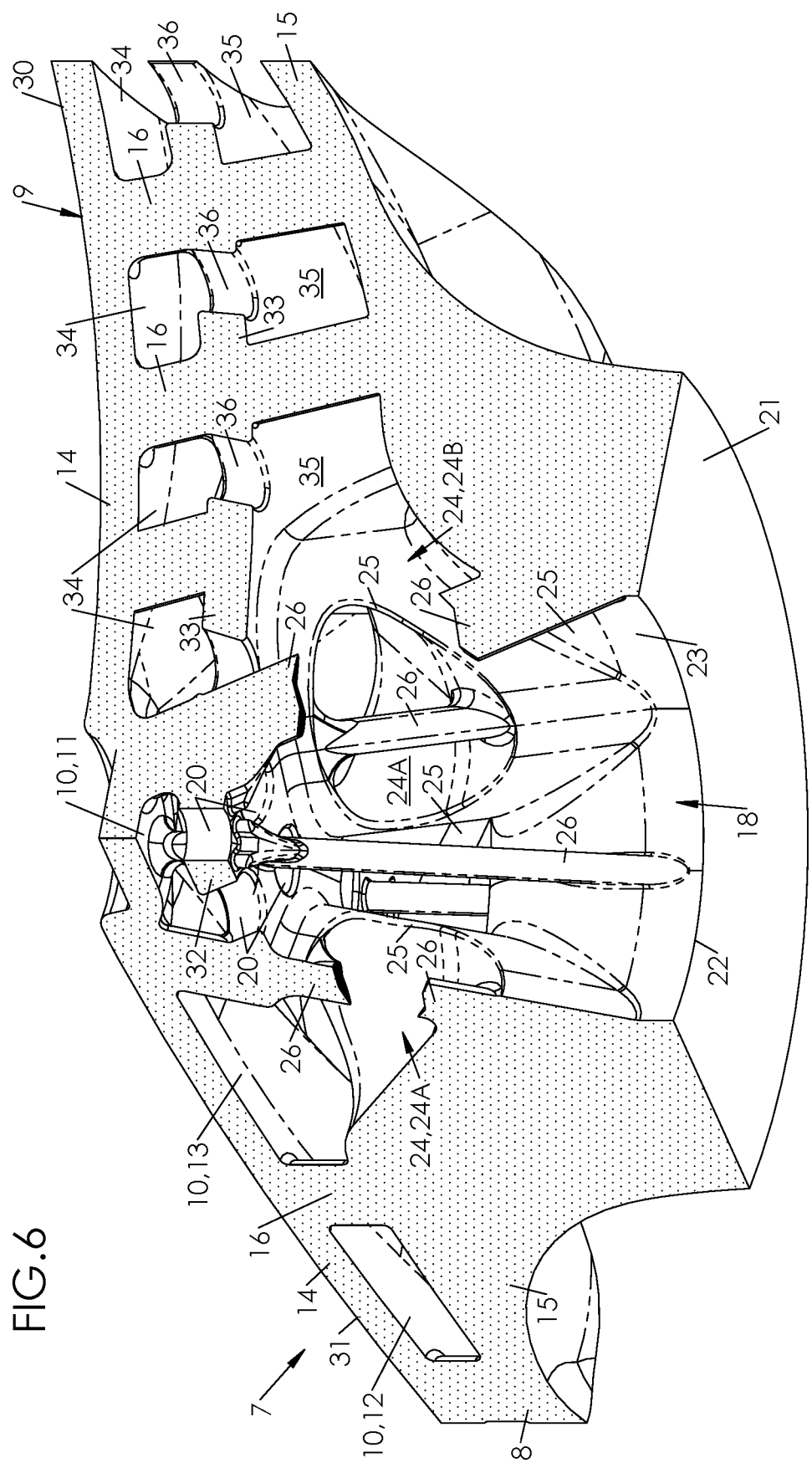
FIG. 6 is a bottom perspective detail view in section of the sector of the mold bottom in FIG. 5.

As can likewise be seen in the drawings, and more particularly in FIG. 5, FIG. 6 and FIG. 10, each stiffener 26 has a fin profile, oriented radially, in horizontal section. This profile has the advantage of setting low resistance against the flow of the heat transfer fluid.

The heat transfer fluid injected into the median zone 13 through the bypass 24 then disperses toward the peripheral zone 12, where it ensures additional heat exchange, before being discharged into a peripheral collector 27 through radial orifices 28 made in the external skin 15, and then channeled through the evacuation duct 19.

Figure 4:
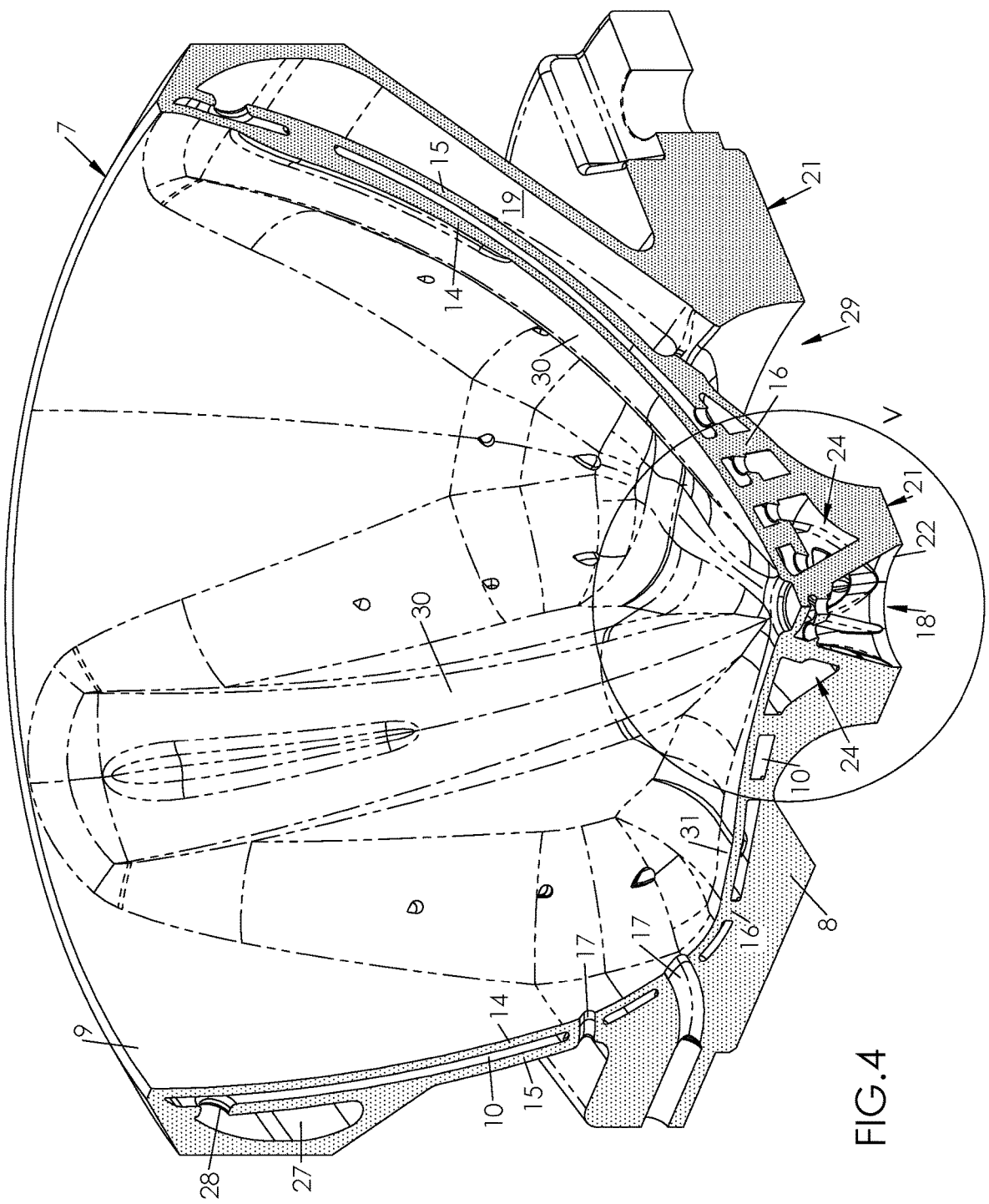
FIG. 4 is a perspective view in section of the mold bottom, on the section plane IV-IV in FIG. 3.
Figure 7:
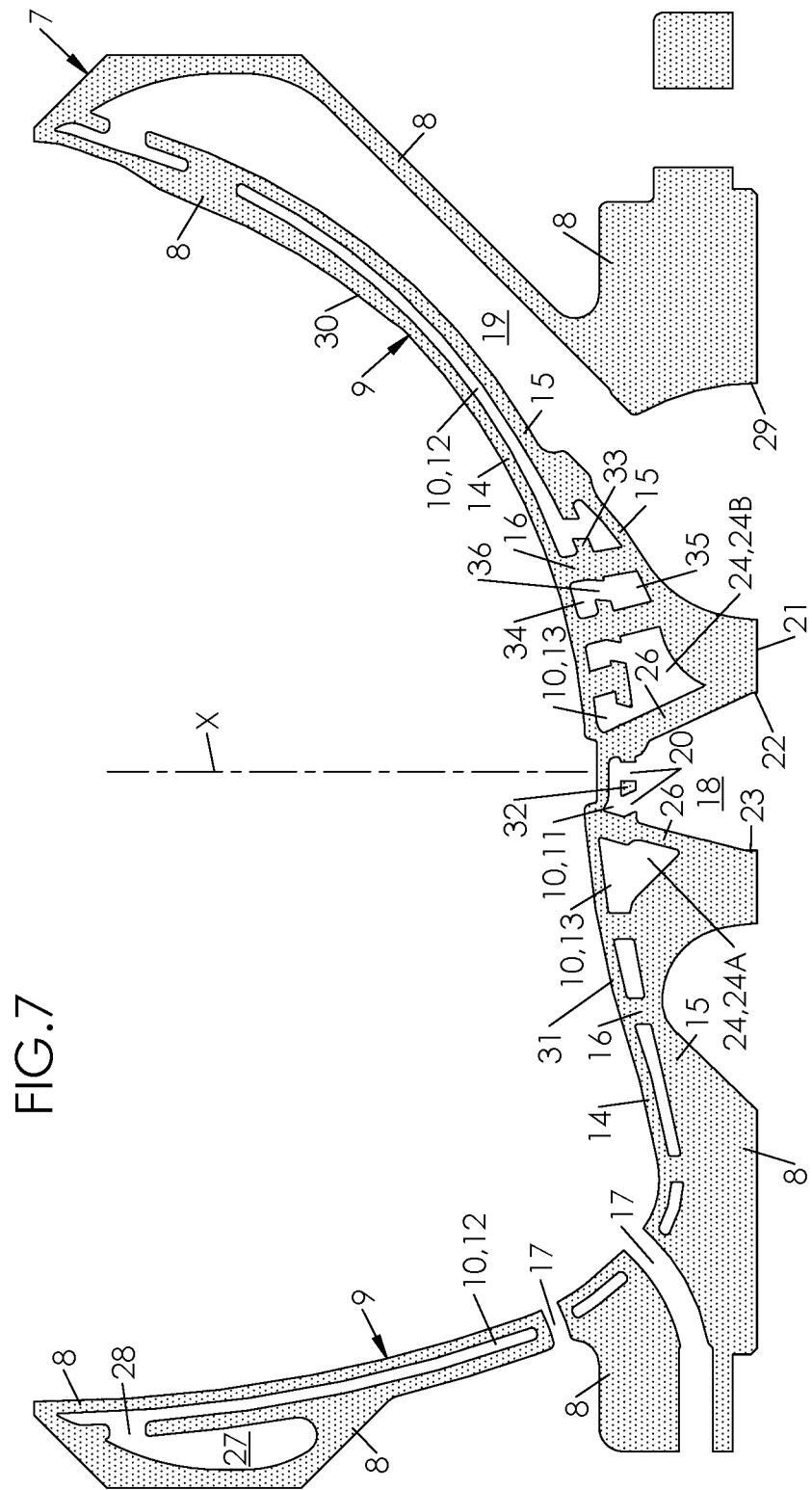
FIG. 7 is a cross section through the mold bottom, on the section plane VII-VII in FIG. 3.

As illustrated in FIG. 4, FIG. 7 and FIG. 9, the evacuation duct 19 leads onto the lower face 21 of the mold bottom 7 through an outlet orifice 29.

Consequently, the central feed duct 18 and the evacuation duct 19 both lead onto the lower face 21 of the mold bottom 7, through the inlet orifice 22 and through the outlet orifice 29, respectively. This arrangement is advantageous since it makes it possible to connect to the mold bottom 7 a hose for conveying the heat transfer fluid that is provided with a quick connector plug for both feeding and evacuating heat transfer fluid.

The mold bottom 7, with its cavity 10, can be manufactured by direct manufacturing, preferably using the technique known as direct metal laser sintering (DMLS).

This technique consists, starting from a three-dimensional model of the mold bottom 7 generated or loaded in a computer-aided design (CAD) environment, in depositing, in a chamber, successive layers of a metal powder (with a typical thickness of between 10 µm and 100 µm) and, following each deposition, locally melting the powder, by means of a high-power laser, in the zones intended to form the material of the molding wall 8.

After the final layer has been deposited, the mold bottom 7 is cleared of the residual power that has not been melted, the latter being collected in order to be recycled. This manufacturing technique can be implemented within a machine such as the one sold by the company EOS under the trade name EOSINT M 280.

The material employed can be steel or aluminum (optionally alloyed). If the heat transfer fluid is water, a stainless steel will preferably be employed for manufacturing the mold bottom 7.

Two embodiments of the mold bottom 7 are illustrated, most of the shared features of which have been described above.

In the first embodiment, illustrated in FIG. 2 to FIG. 8, the mold bottom 7 is intended for the molding of a petaloid container bottom, designed in particular to withstand pressures generated by carbonated beverages.

To this end, the molding surface 9 has a relief with the imprint of such a container bottom, and defines an alternation of ribs 30 (corresponding to valleys in the bottom of the container) and recessed indentations 31 (corresponding to feet on the bottom of the container).

In this first embodiment, the central feed duct 18 ends, on the side of the central zone 11 of the cavity 10, with an end wall 32, which extends perpendicularly (that is to say perpendicularly to the central axis X) and in which central openings 20 are made that place the central duct 18 and the central zone 11 of the cavity 10 in communication.

In this case, and as illustrated in FIG. 8, the bypass 24 is subdivided, and comprises:
 primary bypass channels 24A that each place the central feed duct 18 in communication with a part of the median zone 13 that is situated in the region of a recessed indentation 31;
 secondary bypass channels 24B that each place the central feed duct 18 in communication with a part of the median zone 13 that is situated in the region of a rib 30.

In this embodiment, the sum of the sections (taken at their mouths) of all of the channels 24A, 24B is greater than or equal to 50% (and in this case around 62.5%) of the flow cross section of the central feed duct 18 upstream of the inner mouth 25.

As illustrated in FIG. 6, the primary channels 24A and the secondary channels 24B are preferably disposed in alternation about the central feed duct 18, this corresponding to the alternate disposition of the ribs 30 and recessed indentations 31.

In the example illustrated, each channel 24A, 24B is, at the inner mouth 25, barred vertically by a stiffener 26. In FIG. 5 and FIG. 6, the stiffeners 26 are partially cut away so as to reveal the structural elements located therebehind.

As can be seen very particularly in FIG. 5 and FIG. 6 and FIG. 7, the mold bottom 7 has, in the region of the ribs 30, a web 33 that extends between the internal skin 14 and the external skin 15. In this case, the cavity 10 is subdivided there into an upper chamber 34, which extends between the inner skin 14 and the web 33, and a lower chamber 35, which extends between the web 33 and the external skin 15.

The upper chamber 34 and the lower chamber 35 are in communication via perforations 36. As a result, the fluid taken from the central feed duct 18 by the secondary bypass channels 24B is first of all injected into the lower chamber 35, from where it diffuses toward the upper chamber 34 through the perforations 36 before being channeled toward the peripheral zone 12 of the cavity 10.

In the zone of the ribs 30 that is situated in line with the median zone 13 of the cavity 10, the material is less stretched by the relief of the ribs 30, and is therefore thicker. By contrast, in the zone of the recessed indentations 31 that is situated in line with the median zone 13 of the cavity 10, the material of the container being molded, which is more stretched, is relatively thinner.

The circulation of the fluid passing through the primary channels 24A is illustrated by the solid bold arrows in FIG. 8.1.

The circulation of the fluid passing through the secondary channels 24B is illustrated by the dashed bold arrows in FIG. 8.1.

A second embodiment is illustrated in FIG. 9 and FIG. 10, to show that the architecture that has just been described can be applied to a mold bottom 7 defining a molding surface 9 of which the relief is less marked than in the petaloid case.

The example illustrated is an extreme case in which the molding surface 9 is smooth. In this case, and as can be seen clearly in FIG. 10, the central feed duct 18 leads into the central zone 11 of the cavity 10 through a single, central opening 20.

Furthermore, and as illustrated in FIG. 9, the bypass 24 is advantageously in the form of an individual duct surrounding the central axis X.

In the example illustrated, the bypass 24 even exhibits symmetry of revolution about the central axis X. The inner mouth 25 extends in this case in an annular manner about the central feed duct 18.

As a result, the fluid taken from the central feed duct 18 upstream of the central opening 20 is distributed uniformly over the median zone 13 of the cavity 10.

In the example illustrated, the bypass 24 has a parabolic profile in cross section. In order to maintain a substantially constant speed of flow, the flow cross section is, in the bypass 24, substantially constant over the height, whereas the radial extension of the bypass 24 increases. It is for this reason that the bypass 24 appears to narrow from the inside to the outside when viewed in section, as in FIG. 10.

In this embodiment, the flow cross section of the bypass 24, measured at the inner mouth 25, is advantageously greater than or equal to 70% (and in this case around 75%) of the flow cross section of the central duct upstream of the mouth.

As can furthermore be seen in FIG. 10, the mold bottom 7 comprises a series of regularly spaced-apart stiffeners 26 distributed over the annular inner mouth 25.

As regards the evacuation duct 19, this extends, in this second embodiment, in an annular manner about and under the external skin 15 in order to lead onto the lower face 21 of the mold bottom 7 through a single outlet orifice 29.

Regardless of the embodiment employed, the fluid carried by the central feed duct is separated into a first, central flow injected axially in the central zone 11 through the central opening(s) 20, and into a second flow diverted laterally into the bypass 24 in order to be injected directly into the median zone 13. This results in better thermal regulation of the median zone 13, and therefore in a final container of which the material is thermally regulated better, to the benefit of the mechanical performance of the container.

The invention claimed is:
1. A mold bottom (7) intended for a mold (1) for manufacturing containers by blow-molding or stretch-blow-molding from blanks (2) made of plastics material, this mold bottom (7) extending about a central axis (X) and comprising:
 a molding wall (8), which is formed as a single block and defines a molding surface (9);
 a cavity (10) formed on the inside of the molding wall (8), this cavity (10) having a central zone (11) situated in the vicinity of the central axis (X) of the mold bottom (7), a peripheral zone (12), situated at a distance from the central axis (X), and an intermediate median zone (13) between the central zone (11) and the peripheral zone (12);
 a central duct (18) for feeding heat transfer fluid to the cavity (10), which leads into the central zone (11) through one or more central opening(s) (20);
 at least one duct (19) for evacuating the heat transfer fluid from the cavity (10), into which the peripheral zone (12) leads;

wherein the mold bottom (7) comprises a bypass (24), which places the central duct (18) in direct communication with the median zone (13) of the cavity (10), bypassing the central zone (11).

2. The mold bottom (7) as claimed in claim 1, wherein the central feed duct (18) is delimited radially by a lateral wall (23), through which the bypass (24) opens, by way of an inner mouth (25), into the central duct (18).

3. The mold bottom (7) as claimed in claim 1, wherein the mold bottom (7) is provided with stiffeners (26) that brace the inner mouth (25) of the bypass (24).

4. The mold bottom (7) as claimed in claim 3, wherein each stiffener (26) has a fin profile, oriented radially, in horizontal section.

5. The mold bottom (7) as claimed in claim 1, wherein the cavity (10) is delimited by an internal skin (14), which defines the molding surface (9), and by an external skin (15).

6. The mold bottom (7) as claimed in claim 5, wherein the internal skin (14) has a thickness of between 0.2 mm and 5 mm.

7. The mold bottom (7) as claimed in claim 5, further comprising a network of struts (16) that connect the internal skin (14) and the external skin (15).

8. The mold bottom (7) as claimed in claim 1, wherein the molding surface (9) has a relief with the imprint of a petaloid container, and defines an alternation of ribs (30) and recessed indentations (31).

9. The mold bottom (7) as claimed in claim 8, wherein the bypass (24) comprises:
- primary bypass channels (24A) that each place the central feed duct (18) in communication with a part of the median zone (13) of the cavity (10) that is situated in the region of a recessed indentation (31);
- secondary bypass channels (24B) that each place the central feed duct (18) in communication with a part of the median zone (13) of the cavity (10) that is situated in the region of a rib (30).

10. The mold bottom (7) as claimed in claim 9, wherein the primary channels (24A) and the secondary channels (24B) are disposed in alternation about the central feed duct (18).

11. The mold bottom (7) as claimed in claim 1, wherein the bypass (24) is in the form of an individual duct surrounding the central axis (X).

12. A mold (1) for manufacturing containers from blanks (2) made of plastics material, which comprises at least one mold bottom (7) as claimed in claim 1.

13. The mold bottom (7) as claimed in claim 2, wherein the mold bottom (7) is provided with stiffeners (26) that brace the inner mouth (25) of the bypass (24).

14. The mold bottom (7) as claimed in claim 2, wherein the cavity (10) is delimited by an internal skin (14), which defines the molding surface (9), and by an external skin (15).

15. The mold bottom (7) as claimed in claim 3, wherein the cavity (10) is delimited by an internal skin (14), which defines the molding surface (9), and by an external skin (15).

16. The mold bottom (7) as claimed in claim 4, wherein the cavity (10) is delimited by an internal skin (14), which defines the molding surface (9), and by an external skin (15).

17. The mold bottom (7) as claimed in claim 6, further comprising a network of struts (16) that connect the internal skin (14) and the external skin (15).

18. The mold bottom (7) as claimed in claim 2, wherein the molding surface (9) has a relief with the imprint of a petaloid container, and defines an alternation of ribs (30) and recessed indentations (31).

19. The mold bottom (7) as claimed in claim 3, wherein the molding surface (9) has a relief with the imprint of a petaloid container, and defines an alternation of ribs (30) and recessed indentations (31).

20. The mold bottom (7) as claimed in claim 4, wherein the molding surface (9) has a relief with the imprint of a petaloid container, and defines an alternation of ribs (30) and recessed indentations (31).

* * * * *